(12) United States Patent
Tsukaguchi et al.

(10) Patent No.: US 11,749,421 B2
(45) Date of Patent: Sep. 5, 2023

(54) ELECTRICALLY CONDUCTIVE RESIN COMPOSITION AND METHOD FOR PRODUCING SAME

(71) Applicant: DAINICHISEIKA COLOR & CHEMICALS MFG. CO., LTD., Tokyo (JP)

(72) Inventors: Shingo Tsukaguchi, Tokyo (JP); Taiyo Aoyagi, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 498 days.

(21) Appl. No.: 16/964,254

(22) PCT Filed: Mar. 18, 2019

(86) PCT No.: PCT/JP2019/011089
§ 371 (c)(1),
(2) Date: Jul. 23, 2020

(87) PCT Pub. No.: WO2019/181828
PCT Pub. Date: Sep. 26, 2019

(65) Prior Publication Data
US 2021/0043336 A1 Feb. 11, 2021

(30) Foreign Application Priority Data

Mar. 20, 2018 (JP) .................................. 2018-052474

(51) Int. Cl.
| | |
|---|---|
| *H01B 1/24* | (2006.01) |
| *C08K 3/04* | (2006.01) |
| *B29C 45/00* | (2006.01) |
| *C08K 5/01* | (2006.01) |
| *C08K 5/08* | (2006.01) |
| *C08K 5/23* | (2006.01) |
| *C08K 5/29* | (2006.01) |
| *C08K 5/3437* | (2006.01) |
| *C08K 5/3447* | (2006.01) |
| *C08K 5/45* | (2006.01) |
| *C08K 13/02* | (2006.01) |
| *C08J 3/20* | (2006.01) |
| *C08K 5/00* | (2006.01) |
| *B29B 7/00* | (2006.01) |
| *B29B 7/72* | (2006.01) |
| *B29K 67/00* | (2006.01) |
| *B29K 69/00* | (2006.01) |
| *B29K 77/00* | (2006.01) |

(Continued)

(52) U.S. Cl.
CPC .............. *H01B 1/24* (2013.01); *B29B 7/007* (2013.01); *B29B 7/726* (2013.01); *B29C 45/0001* (2013.01); *C08J 3/20* (2013.01); *C08J 3/203* (2013.01); *C08K 3/04* (2013.01); *C08K 3/041* (2017.05); *C08K 5/0041* (2013.01); *C08K 5/01* (2013.01); *C08K 5/08* (2013.01); *C08K 5/235* (2013.01); *C08K 5/29* (2013.01); *C08K 5/3437* (2013.01); *C08K 5/3447* (2013.01); *C08K 5/45* (2013.01); *C08K 13/02* (2013.01); *B29K 2067/006* (2013.01); *B29K 2069/00* (2013.01); *B29K 2077/00* (2013.01); *B29K 2081/04* (2013.01); *B29K 2105/0023* (2013.01); *B29K 2105/0032* (2013.01); *B29K 2995/0005* (2013.01); *C08K 2201/001* (2013.01)

(58) Field of Classification Search
None
See application file for complete search history.

(56) References Cited

U.S. PATENT DOCUMENTS

| | | |
|---|---|---|
| 4,477,608 A | 10/1984 | Babler et al. |
| 2004/0016912 A1 | 1/2004 | Bandyopadhyay et al. |

(Continued)

FOREIGN PATENT DOCUMENTS

| | | |
|---|---|---|
| JP | 59-056435 | 3/1984 |
| JP | 60-144367 | 7/1985 |

(Continued)

OTHER PUBLICATIONS

Japanese Office Action, issued in corresponding Japanese Patent Application No. 2020-507773, dated Aug. 4, 2020, 10 pages including English translation.

(Continued)

*Primary Examiner* — Katie L. Hammer
(74) *Attorney, Agent, or Firm* — Hamre, Schumann, Mueller & Larson, P.C.

(57) ABSTRACT

Provided is an electrically conductive resin composition with which the characteristics inherent in a thermoplastic resin are easily retained and which exhibits more excellent electrical conductivity even if the blending amount of an electrically conductive filler is small. This electrically conductive resin composition contains a thermoplastic resin, such as a polycarbonate or a polyolefin, and an electrically conductive filler, such as a carbon nanotube. This electrically conductive resin composition further contains a dye, such as a perinone-based dye or a disazo-based dye, which is a component for improving electrical conductivity, and this electrically conductive resin composition can be obtained by kneading or molding a raw material mixture containing a thermoplastic resin, an electrically conductive filler, and a dye under a condition of a temperature equal to or higher than the melting point of the thermoplastic resin.

8 Claims, No Drawings

(51) Int. Cl.
B29K 81/00 (2006.01)
B29K 105/00 (2006.01)

(56) References Cited

U.S. PATENT DOCUMENTS

| | | | | |
|---|---|---|---|---|
| 2004/0144963 | A1* | 7/2004 | Braig | C08K 3/04 264/211 |
| 2004/0217332 | A1* | 11/2004 | Wagener | C08K 3/04 252/500 |
| 2006/0108567 | A1 | 5/2006 | Charati et al. | |
| 2014/0134537 | A1 | 5/2014 | Yamada et al. | |
| 2015/0170788 | A1* | 6/2015 | Miller | B32B 1/00 252/511 |

FOREIGN PATENT DOCUMENTS

| | | |
|---|---|---|
| JP | 2003-510416 | 3/2003 |
| JP | 2006-097006 | 4/2006 |
| JP | 2007-191515 | 8/2007 |
| JP | 2007-277313 | 10/2007 |
| JP | 2009-518463 | 5/2009 |
| JP | 2010-006998 | 1/2010 |
| JP | 2014-098849 | 5/2014 |
| JP | 2015-093910 | 5/2015 |
| JP | 6076542 | 2/2017 |
| WO | 2001023189 | 4/2001 |
| WO | 2014/193039 | 12/2014 |

OTHER PUBLICATIONS

International Search Report on Patentability, issued in the corresponding PCT application No. PCT/JP2019/011089, dated Sep. 22, 2020, with translation, 14 pages.

Extended European Search Report, issued in the corresponding European patent application No. 19770296.2, dated Nov. 11, 2021, 15 pages.

International Search Report, issued in the corresponding PCT application No. PCT/JP2019/011089, dated Jun. 18, 2019, 5 pages, (inlcuding translation).

Japanese Office Action, issued in the related Japanese Patent Application No. 2020-507773, dated Apr. 7, 2020, 10 pages (inlcuding translation).

* cited by examiner

ELECTRICALLY CONDUCTIVE RESIN COMPOSITION AND METHOD FOR PRODUCING SAME

TECHNICAL FIELD

The present invention relates to an electrically conductive resin composition and a method for producing an electrically conductive resin composition.

BACKGROUND ART

Up to now, an electrically conductive filler has been blended in an electrically insulating thermoplastic resin to impart electrical conductivity to the thermoplastic resin. Examples of the electrically conductive filler which is used for such a purpose include metal materials, such as a metal fiber and a metal powder, and besides, carbon-based materials, such as a carbon nanotube and carbon black. An electrically conductive resin composition which is obtained by blending any of these electrically conductive fillers in a thermoplastic resin is used, for example, as a constituent material for electronic/electric parts.

The amount of an electrically conductive filler to be blended in a thermoplastic resin is desirably as small as possible within a range where predetermined electrical conductivity is to be imparted. This is because when the blending amount of the electrically conductive filler is small, the characteristics inherent in the thermoplastic resin are easily retained, and the small blending amount is advantageous also in terms of costs.

In recent years, controlling the shape and the physical properties, such as a specific surface area, of an electrically conductive filler has been studied in order to further improve the electrical conductivity of a resultant electrically conductive resin composition. In addition, attempts to further blend a component for improving the electrical conductivity have also been made. Specifically, there is proposed an electrically conductive resin composition which is obtained by blending a carbon fiber having a predetermined range of fiber diameters in a thermoplastic resin in such a way that the rupture ratio of the carbon fiber is suppressed to 20% (Patent Literature 1). In addition, there is proposed an electrically conductive resin composition containing a carbon-based electrically conductive filler and an alkyl sulfonic acid metal salt blended in a thermoplastic resin (Patent Literature 2).

It is known that the electrical conductivity of a resultant resin composition changes depending on the molding method. Among others, in injection molding, there is a tendency that the higher the speed of injection is, the more deteriorated the electrical conductivity is. For example, from the aspect of materials, increasing the amount of the electrically conductive material, addition of the third component having a low compatibility with a resin, and so on have been devised in order to produce a resin composition excellent in electrical conductivity irrespective of the molding method (Patent Literature 3).

CITATION LIST

Patent Literature

Patent Literature 1: Japanese Patent Laid-Open No. 2006-097006
Patent Literature 2: Japanese Patent Laid-Open No. 2007-277313
Patent Literature 3: Japanese Patent No. 6076542

SUMMARY OF INVENTION

Technical Problem

However, it cannot necessarily be said that the electrical conductivity has been improved sufficiently even in the resin compositions proposed in Patent Literatures 1 and 2. In addition, the resin composition proposed in Patent Literature 1 needs to be produced controlling the shape and the like of the carbon fiber being an electrically conductive filler strictly, and therefore is slightly deficient in versatility. Further, the resin composition proposed in Patent Literature 2 contains an alkyl sulfonic acid metal salt as an essential component, and therefore there is concern that the characteristics inherent in the thermoplastic resin are liable to be impaired.

In addition, by devising the increase in the amount of the electrically conductive material, the addition of the third component, and so on, a resin composition having satisfactory electrical conductivity to some extent can be obtained. However, the content ratio of the components other than the thermoplastic resin increases, and therefore there has been a problem that the characteristics inherent in the thermoplastic resin are liable to be impaired. Further, a method for stably producing an electrically conductive resin composition excellent in electrical conductivity irrespective of the molding method has been desired.

The present invention has been completed in view of such problems of the conventional techniques, and an object of the present invention is to provide an electrically conductive resin composition with which the characteristics inherent in a thermoplastic resin are easily retained and which exhibits more excellent electrical conductivity even if the blending amount of an electrically conductive filler is small. Another object of the present invention is to provide a simple method for producing the electrically conductive resin composition.

Solution to Problem

The present inventors have conducted diligent studies in order to solve the problems to find that the problems can be solved by adding a dye which has not conventionally been known to have a function of "improving electrical conductivity" to a resin, and have thereby completed the present invention.

That is, according to the present invention, an electrically conductive resin composition described below is provided.

[1] An electrically conductive resin composition comprising: a thermoplastic resin; and an electrically conductive filler, wherein the electrically conductive resin composition further comprises a dye being a component for improving electrical conductivity, and is obtained by kneading or molding a raw material mixture comprising: the thermoplastic resin; the electrically conductive filler; and the dye under a condition of a temperature equal to or higher than a melting point of the thermoplastic resin.

[2] The electrically conductive resin composition according to [1], obtained by kneading or molding the raw material mixture under a condition of a temperature equal to or higher than a melting point of the dye.

[3] The electrically conductive resin composition according to [1] or [2], wherein the thermoplastic resin is at least anyone of a polycarbonate, a polyester, a polyamide, and a polyphenylene sulfide.

[4] The electrically conductive resin composition according to any one of [1] to [3], wherein the dye is at least any one of a perinone-based dye, a perylene-based dye, a quinoline-based dye, an anthraquinone-based dye, an azomethine-based dye, a disazo-based dye, and a thioxanthene-based dye.

[5] The electrically conductive resin composition according to any one of [1] to [4], wherein the electrically conductive filler is at least any one of carbon black, a multi-walled carbon nanotube, a single-walled carbon nanotube, graphite, and graphene.

[6] The electrically conductive resin composition according to any one of [1] to [5], wherein a content of the dye is 0.01 to 5 parts by mass based on 100 parts by mass of a total amount of the thermoplastic resin and the electrically conductive filler, and a content of the electrically conductive filler is 0.01 to 30 parts by mass based on 100 parts by mass a total amount of the thermoplastic resin and the electrically conductive filler.

In addition, according to the present invention, a method for producing an electrically conductive resin composition, described below, is provided.

[7] A method for producing an electrically conductive resin composition being a method for producing the electrically conductive resin composition according to anyone of [1] to [6], the method comprising a step of kneading or molding a raw material mixture comprising: a thermoplastic resin, an electrically conductive filler; and a dye under a condition of a temperature equal to or higher than a melting point of the thermoplastic resin.

[8] The method for producing an electrically conductive resin composition according to [7], wherein the raw material mixture is kneaded or molded under a condition of a temperature equal to or higher than a melting point of the dye.

[9] The method for producing an electrically conductive resin composition according to [7] or [8], wherein the raw material mixture is subjected to injection molding.

Advantageous Effects of Invention

According to the present invention, an electrically conductive resin composition which exhibits more excellent electrical conductivity even though the blending amount of an electrically conductive filler is small can be provided. In addition, according to the present invention, a simple method for producing the electrically conductive resin composition can be provided.

DESCRIPTION OF EMBODIMENTS

<Electrically Conductive Resin Composition>

Hereinafter, embodiments of the present invention will be described, but the present invention is not limited to the following embodiments. An electrically conductive resin composition contains a thermoplastic resin and an electrically conductive filler, and further contains a dye being a component for improving electrical conductivity. The electrically conductive resin composition of the present invention is obtained by kneading or molding a raw material mixture containing a thermoplastic resin, an electrically conductive filler, and a dye under a condition of a temperature equal to or higher than the melting temperature of the thermoplastic resin, preferably under a condition of a temperature equal to or higher than the melting point of a dye. Hereinafter, details on the electrically conductive resin composition of the present invention will be described.

(Thermoplastic Resin)

The electrically conductive resin composition of the present invention contains a thermoplastic resin. Examples of the thermoplastic resin include polypropylene, high-density polyethylene, low-density polyethylene, linear low-density polyethylene, a polyphenylene sulfide, a liquid crystalline polymer, an unsaturated polyester, a polyurethane, an acrylic resin, a polyether ether ketone (PEEK), a polyether sulfone, a polyether sulfide, a polystyrene, a polyphenylene ether, an acrylonitrile-butadiene-styrene copolymer (ABS), a polyvinyl chloride (PVC), and a polyacetal (POM). Among others, a polycarbonate, a polyester, a polyamide, and a polyphenylene sulfide are preferable. These thermoplastic resins can be used singly or in combination of two or more thereof.

The content of the thermoplastic resin in the electrically conductive resin composition is preferably 70% by mass or more based on the total amount of the electrically conductive resin composition. When the content of the thermoplastic resin is less than 70% by mass, shapability is deteriorated in some cases.

(Electrically Conductive Filler)

The electrically conductive resin composition of the present invention contains an electrically conductive filler. Examples of the electrically conductive filler include carbon black, such as Ketjenblack, acetylene black, and furnace black, and besides, a multi-walled carbon nanotube, a single-walled carbon nanotube, a cup-stacked type carbon nanotube, graphite, and graphene. Among others, carbon black, a multi-walled carbon nanotube, a single-walled carbon nanotube, a cup-stacked type carbon nanotube are preferable, more preferably carbon black, a multi-walled carbon nanotube, and a single-walled carbon nanotube. These electrically conductive fillers can be used singly or in combination of two or more thereof.

The content of the electrically conductive filler in the electrically conductive resin composition is preferably 0.01 to 30 parts by mass, more preferably 0.5 to 25 parts by mass based on 100 parts by mass of the total amount of the thermoplastic resin and the electrically conductive filler. When the content of the electrically conductive filler is less than 0.01 parts by mass based on 100 parts by mass of the total amount of the thermoplastic resin and the electrically conductive filler, the electrical conductivity of the electrically conductive resin composition and a shaped body which is obtained by using (molding) the electrically conductive resin composition is deficient in some cases. On the other hand, when the content of the electrically conductive filler exceeds 30 parts by mass based on 100 parts by mass of the total amount of the thermoplastic resin and the electrically conductive filler, there is a tendency that the characteristics of the thermoplastic resin are liable to be impaired.

(Dye)

The electrically conductive resin composition of the present invention contains a dye being a component for improving electrical conductivity. When the dye and the electrically conductive filler are compared, the dye has a higher compatibility with the thermoplastic resin. Therefore, it is considered that by allowing the dye to be contained, the electrically conductive filler, which has a relatively low compatibility with the thermoplastic resin, is easily orientated on the surface of the resin composition, so that the surface resistance value of the electrically conductive resin composition is lowered (electrical conductivity is improved). That is, it is inferred that the dye is a component having a function of contributing to an improvement in the dispersibility of the electrically conductive filler in the resin, and when the dye functions as a dispersant, the electrically conductive filler is dispersed in a favorable state in the resin and the electrical conductivity of the resultant resin composition is improved. Accordingly, the electrically conductive resin composition of the present invention exhibits more excellent electrical conductivity even when the blending amount of the electrically conductive filler is small. Further, the electrically conductive resin composition also has an advantageous point that the characteristics inherent in the thermoplastic resin are easily retained because the blending amount of the electrically conductive filler can be reduced.

As the dye, a general dye which is used for coloring a resin (dye for coloring a resin) can be used. Examples of the dye include a perinone-based dye, a disazo-based dye, an anthraquinone-based dye, a heterocyclic dye, a perylene-based dye, an azo-based dye, a methine-based dye, a naphthalimide-based dye, an azomethine-based dye, a coumarin-based dye, an anthrapyridone-based dye, an azine-based dye, a phthalocyanine-based dye, a thioindigo-based dye, a quinoline-based dye, and a thioxanthene-based dye. Among others, a perinone-based dye, a perylene-based dye, a quinoline-based dye, an anthraquinone-based dye, a disazo-based dye, an azomethine-based dye, and a thioxanthene-based dye are preferable, more preferably a perinone-based dye, a perylene-based dye, a quinoline-based dye, an anthraquinone-based dye, an azomethine dye, and a thioxanthene-based dye, because the electrical conductivity can efficiently be improved in a smaller amount. These dyes can be used singly or in combination of two or more thereof.

The content of the dye in the electrically conductive resin composition is preferably 0.01 to 5 parts by mass, more preferably 0.1 to 3 parts by mass, and particularly preferably 0.3 to 1 part by mass based on 100 parts by mass of the total amount of the thermoplastic resin and the electrically conductive filler. When the content of the dye is less than 0.01 parts by mass based on 100 parts by mass of the total amount of the thermoplastic resin and the electrically conductive filler, the effect of improving the electrical conductivity is slightly deficient in some cases. On the other hand, when the content of the dye exceeds 5 parts by mass based on 100 parts by mass of the total amount of the thermoplastic resin and the electrically conductive filler, there is concern over bleed out, deterioration of mechanical properties, and the like.

(Additional Component)

If necessary, a component (additional component) other than the thermoplastic resin, the electrically conductive filler, and the dye can be blended in the electrically conductive resin composition. Examples of the additional component include an antioxidizing agent, a flame retardant, and a lubricant.

<Method for Producing Electrically Conductive Resin Composition>

The electrically conductive resin composition of the present invention is obtained by kneading or molding a raw material mixture containing the previously described thermoplastic resin, electrically conductive filler, and dye under a condition of a temperature equal to or higher than the melting point of the thermoplastic resin. That is, the method for producing an electrically conductive resin composition of the present invention includes a step (kneading/molding step) of kneading or molding the above-described raw material mixture under a condition of a temperature equal to or higher than the melting point of the thermoplastic resin.

For example, the thermoplastic resin, the electrically conductive filler, and the additional component which is blended if necessary are melt-kneaded and then granulated to make a pellet using an extruder in the kneading/molding step. The method of melt-kneading is not particularly limited, and a known melt-kneading method can be adopted. Specific examples of the method include a method in which respective components are mixed in advance using anyone of various mixers such as a high-speed mixer, including a tumbler and a Henschel mixer, and melt-kneading is then performed with a kneading apparatus, such as a Banbury mixer, a roll, a plastograph, a single-screw extruder, a twin-screw extruder, or a kneader. Among others, a method of using an extruder is preferable, more preferably a method of using a twin-screw extruder from the viewpoint of production efficiency.

Subsequently, the raw material mixture is obtained by mixing the granulated pellet and the dye, and the obtained raw material mixture is kneaded or molded under a condition of a temperature equal to or higher than the melting point of the thermoplastic resin. Thereby, the electrically conductive resin composition (electrically conductive resin-shaped product) can be obtained. When the temperature at the time of kneading or molding the raw material mixture is lower than the melting point of the thermoplastic resin, the electrically conductive resin composition cannot be obtained. In addition, the raw material mixture is preferably kneaded or molded under a condition of a temperature equal to or higher than the melting point of the dye. When the raw material mixture is kneaded or molded at a temperature equal to or higher than the melting point of the dye, the dye can be melted in a more favorable state in the thermoplastic resin, so that the electrical conductivity of a resultant electrically conductive resin composition can be improved further.

As the molding method, a known molding method for molding a thermoplastic resin can be adopted. Specific examples of the molding method include an injection molding method, a press molding method, and an extrusion shaping method. Among others, performing injection molding on the raw material mixture is preferable for the purpose of improving productivity more. As the injection molding method, a known injection molding method can be adopted.

As described previously, the electrical conductivity of a resultant electrically conductive resin composition usually changes depending on the molding method. Particularly, in the case of injection molding, the higher the speed of injection is, the more easily the electrical conductivity of a resultant product is deteriorated. In contrast, in the method for producing an electrically conductive resin composition of the present invention, the raw material mixture containing a dye, which is a component for improving the electrical conductivity and is expected to also have a function as a dispersant that improves the dispersibility of the electrically conductive filler, is kneaded or molded under a particular condition described above. Therefore, even when the raw material mixture is molded by injection molding, among others, injection molding in which injection is performed at a high speed, the electrical conductivity of a resultant electrically conductive resin composition is unlikely to be deteriorated, so that an electrically conductive resin composition (molded article) excellent in electrical conductivity can be produced. In addition, an electrically conductive resin composition excellent in electrical conductivity can be obtained even by injection molding in which injection is performed at a high speed, and therefore a large quantity of products can be produced in a short time and productivity can be enhanced.

EXAMPLES

Hereinafter, the present invention will specifically be described based on Examples, but the present invention is not limited to these Examples. It is to be noted that "parts" and "%" in Examples and Comparative Examples are each on a mass basis unless otherwise noted.

<Production of Electrically Conductive Resin Composition (Injection Molded Product)>

Example 1

Into a mixer (trade name "Super mixer Model SMB-20", manufactured by KAWATA MFG. CO., LTD), 95 parts of a polycarbonate (trade name "L1225WP", manufactured by TEIJIN LIMITED, melting point: about 250° C.) and 5 parts of a multi-walled carbon nanotube (MWNT, trade name "NC7000", manufactured by Nanocyl SA) were loaded, and mixing was performed for 1 minute to obtain a mixture. The obtained mixture was loaded into a twin-screw extruder (trade name "TEX30", manufactured by THE JAPAN STEEL WORKS, LTD.) the preset temperature of which was 280° C. to perform melt-kneading and granulation, thereby obtaining a granulated product. The obtained granulated product and 0.5 parts of Solvent Red 179 (trade name "MACROLEX RED E2GGRAN", manufactured by LANXESS AG) were put into a plastic bag to perform mixing, thereby obtaining a raw material mixture 1.

The obtained raw material mixture 1 was subjected to injection molding using an injection molding machine (Model "J110AD-180H", manufactured by THE JAPAN STEEL WORKS, LTD.) under a condition including a cylinder temperature of 320° C. and a metal mold temperature of 120° C. in two patterns, at a low speed (20 mm/s) and at a high speed (300 mm/s), thereby producing plates (150 mm×80 mm×2 mmt).

Examples 2 to 20 and Comparative Examples 1 to 7

Raw material mixtures 2 to 24 were each prepared in the same manner as in Example 1 described previously, except that the combination (unit: part) was changed to those shown in Tables 1-1 and 1-2. In addition, plates were each produced in the same manner as in Example 1 described previously, except that the prepared raw material mixtures 2 to 24 were each prepared in place of the raw material mixture 1, and that the cylinder temperature was set to the temperature (molding temperature) shown in Table 3. Details on the dyes used are described in Table 2. It is to be noted that the melting point of the polybutylene terephthalate is about 220° C., the melting point of the polyphenylene sulfide is about 280° C., and the melting point of polyamide 6 is about 225° C. In addition, the "carbon black" in Tables 1-1 and 1-2 is acetylene black (trade name "DENKA BLACK Granule Product"), manufactured by Denka Company Limited.

TABLE 1-1

| | | Raw material mixture | | | | | | | | | | | |
|---|---|---|---|---|---|---|---|---|---|---|---|---|
| | | 1 | 2 | 3 | 4 | 5 | 6 | 7 | 8 | 9 | 10 | 11 | 12 |
| Thermoplastic resin | Polycarbonate | 95 | 95 | 95 | 95 | 95 | 95 | 95 | 95 | 95 | 95 | 95 | 95 |
| | Polybutylene terephthalate | | | | | | | | | | | | |
| | Polyphenylene sulfide | | | | | | | | | | | | |
| | Polyamide 6 | | | | | | | | | | | | |
| MWNT | | 5 | 5 | 5 | 5 | 5 | 5 | 5 | 5 | 5 | 5 | 5 | 5 |
| Carbon black | | | | | | | | | | | | | |
| Dye | Solvent Red 179 | 0.5 | | | | | | | | | | | |
| | Solvent Red 135 | | 0.5 | 0.1 | | | | | | | | | |
| | Solvent Orange 60 | | | | 0.5 | | | | | | | | |
| | Solvent Green 5 | | | | | 0.5 | | | | | | | |
| | Disperse Yellow 54 | | | | | | 0.5 | | | | | | |
| | Solvent Brown 53 | | | | | | | 0.5 | | | | | |
| | Solvent Yellow 98 | | | | | | | | 0.5 | 0.1 | | | |
| | Disperse Blue 60 | | | | | | | | | | 0.5 | | |
| | Solvent Yellow 93 | | | | | | | | | | | 3 | |
| | Solvent Red 24 | | | | | | | | | | | | 3 |

TABLE 1-2

| | | Raw material mixture | | | | | | | | | | | |
|---|---|---|---|---|---|---|---|---|---|---|---|---|
| | | 13 | 14 | 15 | 16 | 17 | 18 | 19 | 20 | 21 | 22 | 23 | 24 |
| Thermoplastic resin | Polycarbonate | 80 | | | | | | | 95 | | 80 | | |
| | Polybutylene terephthalate | | 96 | | | | | | | 96 | | | |
| | Polyphenylene sulfide | | | 95 | 95 | 95 | 95 | | | | | 95 | |
| | Polyamide 6 | | | | | | | 95 | | | | | 95 |
| MWNT | | | 4 | 5 | 5 | 5 | 5 | 5 | 5 | 4 | | 5 | 5 |
| Carbon black | | 20 | | | | | | | | | 20 | | |
| Dye | Solvent Red 179 | 0.5 | 0.5 | 0.5 | | | | | 0.5 | | | | |
| | Solvent Red 135 | | | | 0.5 | | | | | | | | |
| | Solvent Orange 60 | | | | | | | | | | | | |
| | Solvent Green 5 | | | | | 0.5 | | | | | | | |
| | Disperse Yellow 54 | | | | | | 0.5 | | | | | | |
| | Solvent Brown 53 | | | | | | | | | | | | |
| | Solvent Yellow 98 | | | | | | | | | | | | |
| | Disperse Blue 60 | | | | | | | | | | | | |
| | Solvent Yellow 93 | | | | | | | | | | | | |
| | Solvent Red 24 | | | | | | | | | | | | |

TABLE 2

| Type of dye | Structure | Melting point (° C.) |
|---|---|---|
| Solvent Red 179 | Perinone-based | 255 |
| Solvent Red 135 | Perinone-based | 318 |
| Solvent Orange 60 | Perinone-based | 228 |
| Solvent Green 5 | Perylene-based | 205 |
| Disperse Yellow 54 | Quinoline-based | 263 |
| Solvent Brown 53 | Azomethine-based | 280 |
| Disperse Blue 60 | Anthraquinone-based | 194 |
| Solvent Yellow 98 | Thioxanthene-based | 107 |
| Solvent Yellow 93 | Methine-based | 181 |
| Solvent Red 24 | Disazo-based | 185 |

<Evaluation (1)>
(Measurement of Surface Resistance Value (1))

The surface resistance values of the produced plates were measured using a resistivity meter (trade name "Loresta GP", model "MCP-HT450", manufactured by Nittoseiko Analytech Co., Ltd.). It is to be noted that the surface resistance values of the plates were measured using ASP Probe (model number "MCP-TP03P", manufactured by Nittoseiko Analytech Co., Ltd.) as a probe under a condition of an applied voltage of 90 V. Measurement results are shown in Table 3.

TABLE 3

| | | Melting point of dye (° C.) | Molding temperature (° C.) | Surface resistance value (Ω/) | |
|---|---|---|---|---|---|
| | Raw material mixture | | | Low-speed injection | High-speed injection |
| Example | 1 | 1 | 255 | 320 | 3.8E+01 | 3.9E+01 |
| | 2 | 2 | 318 | 320 | 2.3E+01 | 2.3E+01 |
| | 3 | 2 | 318 | 280 | 9.0E+04 | 4.6E+06 |
| | 4 | 3 | 318 | 320 | 4.0E+02 | 3.2E+02 |
| | 5 | 4 | 228 | 320 | 2.2E+01 | 2.3E+01 |
| | 6 | 5 | 205 | 320 | 2.5E+01 | 2.1E+01 |
| | 7 | 6 | 263 | 320 | 4.1E+01 | 1.8E+01 |
| | 8 | 7 | 280 | 320 | 6.9E+01 | 4.2E+01 |
| | 9 | 8 | 107 | 320 | 1.3E+01 | 5.0E+01 |
| | 10 | 9 | 107 | 320 | 5.9E+02 | 3.2E+02 |
| | 11 | 10 | 194 | 320 | 2.2E+01 | 2.1E+01 |
| | 12 | 11 | 181 | 320 | 3.8E+01 | 3.9E+01 |
| | 13 | 12 | 185 | 320 | 4.2E+01 | 4.5E+01 |
| | 14 | 13 | 255 | 320 | 3.8E+03 | 7.3E+03 |
| | 15 | 14 | 255 | 260 | 6.8E+03 | 6.7E+03 |
| | 16 | 15 | 255 | 320 | 6.2E+00 | 5.7E+00 |
| | 17 | 16 | 318 | 320 | 6.9E+00 | 8.4E+00 |
| | 18 | 17 | 205 | 320 | 8.2E+00 | 7.5E+00 |
| | 19 | 18 | 263 | 320 | 6.8E+00 | 6.1E+00 |
| | 20 | 19 | 255 | 280 | 2.6E+03 | 3.8E+04 |
| Comparative Example | 1 | 20 | — | 320 | 5.2E+04 | 1.0E+8< |
| | 2 | 20 | — | 280 | 8.0E+05 | 1.0E+8< |
| | 3 | 21 | — | 260 | 3.2E+06 | 1.0E+8< |
| | 4 | 21 | — | 245 | 6.8E+06 | 1.0E+8< |
| | 5 | 22 | — | 320 | 1.9E+04 | 5.0E+04 |
| | 6 | 23 | — | 320 | 1.4E+01 | 7.4E+02 |
| | 7 | 24 | — | 280 | 1.0E+8< | 1.0E+8< |

<Production of Electrically Conductive Resin Composition (Press Molded Product)>

Example 21

Into LABOPLASTOMILL (manufactured by Toyoseiki Seisaku-sho, Ltd.) the preset temperature of which was 280° C., 100 parts of a polycarbonate (trade name "L1225WP", manufactured by TEIJIN LIMITED, melting point: about 250° C.), 0.03 parts of a single-walled carbon nanotube (SWNT, trade name "TUBALL", manufactured by OCSiAl), and 0.05 parts of Solvent Red 179 (trade name "MACROLEX RED E2GGRAN", perinone-based dye, melting point of 255° C., manufactured by LANXESS AG) were loaded to perform melt-kneading, thereby obtaining a resin composition. The obtained resin composition was press-molded using a press molding machine (manufactured by Shinto Metal Industries, Ltd.) the preset temperature of which was 280° C. to produce a press molded product with 1 mmt.

Comparative Example 8

A press molded product was produced in the same manner as in Example 21 described previously, except that Solvent Red 179 was not used.
<Evaluation (2)>
(Measurement of Surface Resistance Value (2)>

The surface resistance values of the produced press molded products were measured in the same manner as in the previously described "Measurement of Surface Resistance Value (1)". As a result, the press molded product obtained in Example 21 had a surface resistance value of 8.60E+06(Ω/), and the press molded product obtained in Comparative Example 8 had a surface resistance value of 1.00E+08≤(Ω/).

INDUSTRIAL APPLICABILITY

The electrically conductive resin composition of the present invention is useful as a constituent material of electronic/electric parts and the like.

The invention claimed is:

1. An electrically conductive resin composition comprising:
    a thermoplastic resin; and
    an electrically conductive filler, wherein
    the electrically conductive resin composition further comprises a dye as a component that increases electrical conductivity of the composition,
    the electrically conductive resin composition is obtained by kneading or molding a raw material mixture comprising:
        the thermoplastic resin;
        the electrically conductive filler; and
        the dye,
    at a temperature of equal to or higher than a melting point of the thermoplastic resin, and
    the dye is at least one material selected from the group consisting of a perinone-based dye, a perylene-based dye, a quinoline-based dye, an azomethine-based dye, a disazo-based dye, a thioxanthene-based dye, and a methine-based dye.

2. The electrically conductive resin composition according to claim 1,
    wherein the temperature of kneading or molding the raw material mixture is equal to or higher than a melting point of the dye.

3. The electrically conductive resin composition according to claim 1,
    wherein the thermoplastic resin is at least one material selected from the group consisting of a polycarbonate, a polyester, a polyamide, and a polyphenylene sulfide.

4. The electrically conductive resin composition according to claim 1,
    wherein the electrically conductive filler is at least one material selected from the group consisting of carbon black, a multi-walled carbon nanotube, a single-walled carbon nanotube, graphite, and graphene.

5. The electrically conductive resin composition according to claim 1, wherein
   a content of the dye is in a range from 0.01 to 5 parts by mass relative to 100 parts by mass of a total amount of the thermoplastic resin and the electrically conductive filler, and
   a content of the electrically conductive filler is in a range from 0.01 to 30 parts by mass relative to 100 parts by mass of the total amount of the thermoplastic resin and the electrically conductive filler.

6. A method for producing an electrically conductive resin composition according to claim 1, the method comprising:
   kneading or molding the raw material mixture at the temperature of equal to or higher than the melting point of the thermoplastic resin.

7. The method for producing an electrically conductive resin composition according to claim 6,
   wherein the raw material mixture is kneaded or molded at a temperature of equal to or higher than a melting point of the dye.

8. The method for producing an electrically conductive resin composition according to claim 6,
   wherein the raw material mixture is subjected to injection molding.

\* \* \* \* \*